United States Patent
Flaherty et al.

(10) Patent No.: US 10,654,421 B2
(45) Date of Patent: May 19, 2020

(54) MULTI-SPORT WATERCRAFT CARRIER

(71) Applicant: Thule Sweden AB, Hillerstorp (SE)

(72) Inventors: Joseph Flaherty, Prospect, CT (US); Michael Maximenko, Naugatuck, CT (US); David Castano Galindo, Waterbury, CT (US)

(73) Assignee: Thule Sweden AB, Hillerstorp (SE)

( * ) Notice: Subject to any disclaimer, the term of this patent is extended or adjusted under 35 U.S.C. 154(b) by 243 days.

(21) Appl. No.: 15/210,493

(22) Filed: Jul. 14, 2016

(65) Prior Publication Data
US 2018/0015885 A1   Jan. 18, 2018

(51) Int. Cl.
*B60R 9/048* (2006.01)
*B60R 9/045* (2006.01)
*B60R 9/08* (2006.01)
*B63B 32/80* (2020.01)

(52) U.S. Cl.
CPC ............ *B60R 9/045* (2013.01); *B60R 9/048* (2013.01); *B60R 9/08* (2013.01); *B63B 32/80* (2020.02)

(58) Field of Classification Search
CPC .......... B60R 9/045; B60R 9/048; B60R 9/08; B60R 9/10; B60R 9/06; B63B 35/85; B63B 2035/715; B63B 35/7946; Y10S 224/924; B60P 3/1008
USPC ....... 224/324, 503, 282, 502, 504, 505, 506, 224/507, 508, 509, 553, 924, 309; 411/412
See application file for complete search history.

(56) References Cited

U.S. PATENT DOCUMENTS

| 7,055,725 | B1* | 6/2006 | Kolda | B60R 9/06 224/497 |
| 2004/0238582 | A1* | 12/2004 | Pedrini | B60R 9/10 224/519 |
| 2009/0120984 | A1* | 5/2009 | Sautter | B60R 9/06 224/497 |
| 2011/0163142 | A1* | 7/2011 | Farber | B60R 9/08 224/545 |
| 2013/0062385 | A1* | 3/2013 | Pedrini | B60R 9/06 224/501 |
| 2014/0144958 | A1* | 5/2014 | Sautter | B60R 9/045 224/314 |
| 2014/0183237 | A1* | 7/2014 | Wolfe | B60R 9/10 224/403 |

FOREIGN PATENT DOCUMENTS

EP    2703224 A1 *   3/2014   ............... B60R 9/06

* cited by examiner

*Primary Examiner* — Nathan J Newhouse
*Assistant Examiner* — Matthew T Theis
(74) *Attorney, Agent, or Firm* — Sterne, Kessler, Goldstein & Fox P.L.L.C.

(57) ABSTRACT

A watercraft carrier includes a central hub having an upper surface configured to receive a watercraft, an upright rotatably coupled to the central hub and configured to be disposed in a plurality of positions, and a locking assembly coupling the upright with the central hub and configured to secure the upright in the plurality of positions. The locking assembly is disposed below the upper surface of the central hub. A portion of the upright is disposed above the upper surface of the central hub in a first position and the upright is disposed below the upper surface of the central hub in a second position.

28 Claims, 14 Drawing Sheets

MULTI-SPORT WATERCRAFT CARRIER

BACKGROUND

Field

The present disclosure relates to watercraft carriers. More specifically, embodiments of the present disclosure relate to watercraft carriers that can be used with multiple types of watercraft.

Background

Devices for carrying equipment, such as watercraft, for example but not limited to, kayaks, canoes, surfboards, paddleboards, etc., on a vehicle can be used to transport the watercraft from one place to another. The watercraft can be secured to the carrier to safely and conveniently transport the watercraft, for example, on the roof of a motor vehicle.

BRIEF SUMMARY

In some embodiments, a watercraft carrier can include a central hub having an upper surface configured to receive a watercraft, an upright rotatably coupled to the central hub and configured to be disposed in a plurality of positions, and a locking assembly coupling the upright with the central hub and configured to secure the upright in the plurality of positions. In some embodiments, the locking assembly can be disposed below the upper surface of the central hub. In some embodiments, a portion of the upright can be disposed above the upper surface of the central hub in a first position. In some embodiments, the upright can be disposed below the upper surface of the central hub in a second position. In some embodiments, the upright can be parallel to the upper surface of the central hub in the second position.

In some embodiments, the upper surface of the central hub can include one or more pads configured to engage a surface of the watercraft. In some embodiments, the one or more pads can be made of rubber or foam.

In some embodiments, the upright can include a first post coupled to a first side of the central hub, a second post coupled to a second side of the central hub, and a crossbar disposed between the first post and the second post. In some embodiments, the upright can be a unitary member.

In some embodiments, the locking assembly can include a pivot bolt extending through the first post, the central hub, and the second post. In some embodiments, the locking assembly can include a handle configured to rotate about the pivot bolt to releasably secure the upright in the plurality of positions.

In some embodiments, the central hub can include a side faceplate having a plurality of grooves configured to receive an attachment end of the upright. In some embodiments, the side faceplate can be perpendicular to the upper surface of the central hub. In some embodiments, the grooves can define concave surfaces on the side faceplate. In some embodiments, the grooves can have a first ridge and a second ridge protruding from the side faceplate defining edges of the grooves. In some embodiments, a second ridge of a first can groove define a first ridge of a second groove. In some embodiments, the upright can be parallel to the upper surface of the central hub when the upright is disposed in a first groove. In some embodiments, the upright can be perpendicular to the upper surface of the central hub when the upright is disposed in a second groove. In some embodiments, the side faceplate can include five grooves. In some embodiments, the upright can be disposed at an angle of 0 degrees, 75 degrees, 90 degrees, 105 degrees, and 180 degrees with respect to the upper surface of the central hub when the upright is disposed in a first, second, third, fourth, and fifth groove, respectively.

In some embodiments, the watercraft carrier can include a first wing having a proximal end adjacent the central hub, a distal end, and an upper surface. In some embodiments, the distal end of the first wing can be disposed vertically above a plane including the upper surface of the central hub. In some embodiments, the upper surface of the first wing can extend upward from the proximal end and downward toward the distal end. In some embodiments, the upper surface of the first wing can include one or more pads configured to engage a surface of the watercraft.

In some embodiments, the watercraft carrier can include a second wing disposed opposite the first wing, the second wing having a proximal end adjacent the central hub, a distal end, and an upper surface. In some embodiments, the distal end of the second wing can be disposed vertically above a plane including the upper surface of the central hub. In some embodiments, the upper surface of the second wing can extend upward from the proximal end and downward toward the distal end.

In some embodiments, the watercraft carrier can include an elongate base frame having a central portion. In some embodiments, a pair of arms can extend from the central portion. In some embodiments, the central hub can be disposed on the central portion of the base frame, the first wing can be disposed on a first arm, and the second wing can be disposed on a second arm. In some embodiments, a distal end of the first arm and a distal end of the second arm can be disposed vertically above a plane including the central portion of the base frame.

In some embodiments, the watercraft carrier can include a mounting assembly coupled to the central hub and configured to mount the watercraft carrier on a load bar of a vehicle. In some embodiments, the watercraft carrier can be configured to carry a first type of watercraft when the upright is in a first position and the watercraft carrier can be configured to carry a second type of watercraft when the upright is in a second position. In some embodiments, the first type of watercraft can be a kayak or canoe and the second type of watercraft can be a surfboard or stand up paddleboard. In some embodiments, a portion of the upright can be disposed above the upper surface of the central hub in the first position. In some embodiments, the upright can be disposed below the upper surface of the central hub in the second position.

In some embodiments, a watercraft carrier for carrying multiple types of watercraft on a vehicle can include a base frame having a central portion and a pair of arms extending from the central portion and a central hub having an upper surface. In some embodiments, the central hub can be disposed on the central portion of the base frame. In some embodiments, the watercraft carrier can include a first wing having an upper surface and a second wing having an upper surface. In some embodiments, the first wing can be disposed on a first arm of the base frame and the second wing can be disposed on a second arm of the base frame. In some embodiments, an upright can be rotatably coupled to the central hub and configured to be disposed in a plurality of positions. In some embodiments, a locking assembly can couple the upright with the central hub and be configured to secure the upright in the plurality of positions. In some embodiments, the locking assembly can be disposed below the upper surface of the central hub.

In some embodiments, the upper surfaces of the central hub, the first wing, and the second wing can include pads configured to receive multiple types of watercraft. In some embodiments, the upright can be configured to rotate from a first position where a portion of the upright is disposed above the upper surface of the central hub to a second position where the upright is disposed below the upper surface of the central hub. In some embodiments, the watercraft carrier can be configured to receive one or more kayaks or canoes in the first position and configured to receive a surfboard or stand up paddleboard in the second position. In some embodiments, a crossbar of the upright can pass proximate a distal end of the first wing when rotating the upright from the first position to the second position.

In some embodiments, an adjustable watercraft carrier for carrying watercrafts of different sizes can include a central hub having an upper surface configured to receive a watercraft, a first wing having an upper surface configured to receive the watercraft, and a second wing having an upper surface configured to receive the watercraft. In some embodiments, the first wing can be configured to translate longitudinally with respect to the central hub from a first position to a second position. In some embodiments, the central hub, the first wing, and the second wing can be disposed on a longitudinal rail. In some embodiments, the second wing can be configured to translate longitudinally with respect to the central hub from a first position to a second position.

In some embodiments, the first wing of the watercraft carrier can include a lock strip having a plurality of slots and a lever having an activation end and a tooth. In some embodiments, the first wing can be disposed in the first position when the tooth is disposed in a first slot and the first wing can be disposed in the second position when the tooth is disposed in a second slot. In some embodiments, pressing the activation end of the lever can disengage the tooth from a slot. In some embodiments, longitudinal translation of the first wing can be permitted when the tooth is disengaged from the slots and longitudinal translation of the first wing can be prevented when the tooth is engaged in a slot.

In some embodiments, the watercraft carrier can be configured to receive a first watercraft having a first width when the first wing is disposed in the first position and the watercraft carrier can be configured to receive a second watercraft having a second width when the first wing is disposed in the second position.

In some embodiments, the watercraft carrier can include an upright rotatably coupled to the central hub and configured to be disposed in a plurality of positions. In some embodiments the watercraft carrier can include a locking assembly coupling the upright with the central hub and configured to secure the upright in the plurality of positions. In some embodiments, the locking assembly can be disposed below the upper surface of the central hub.

In some embodiments, a method of adjusting a watercraft carrier for carrying a watercraft on a vehicle can include positioning an upright coupled to a central hub of the watercraft carrier in a first position. In some embodiments, the upright can have a locking assembly disposed below an upper surface of the central hub. In some embodiments, the watercraft carrier can be configured to support a first type of watercraft when the upright is in the first position. In some embodiments, the method can include rotating the upright to a second position such that the watercraft carrier is configured to support a second type of watercraft when the upright is in the second position.

In some embodiments, positioning the upright in the first position can include rotating the upright such that a portion of the upright is disposed above the upper surface of the central hub. In some embodiments, rotating the upright to the second position can include rotating the upright such that the upright is disposed below the upper surface of the central hub. In some embodiments, rotating the upright from the first position to the second position can include disengaging the upright from a first groove on a side faceplate of the central hub and engaging the upright with a second groove on the side faceplate of the central hub.

In some embodiments, the method can include translating a first wing of the watercraft carrier from a first longitudinal position to a second longitudinal position. In some embodiments, the method can include translating a second wing of the watercraft carrier from a first longitudinal position to a second longitudinal position. In some embodiments, the method can include activating a lever to disengage a tooth on the lever from a slot in a lock strip and sliding the first wing along a rail until the tooth engages a second slot in the lock strip.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1:
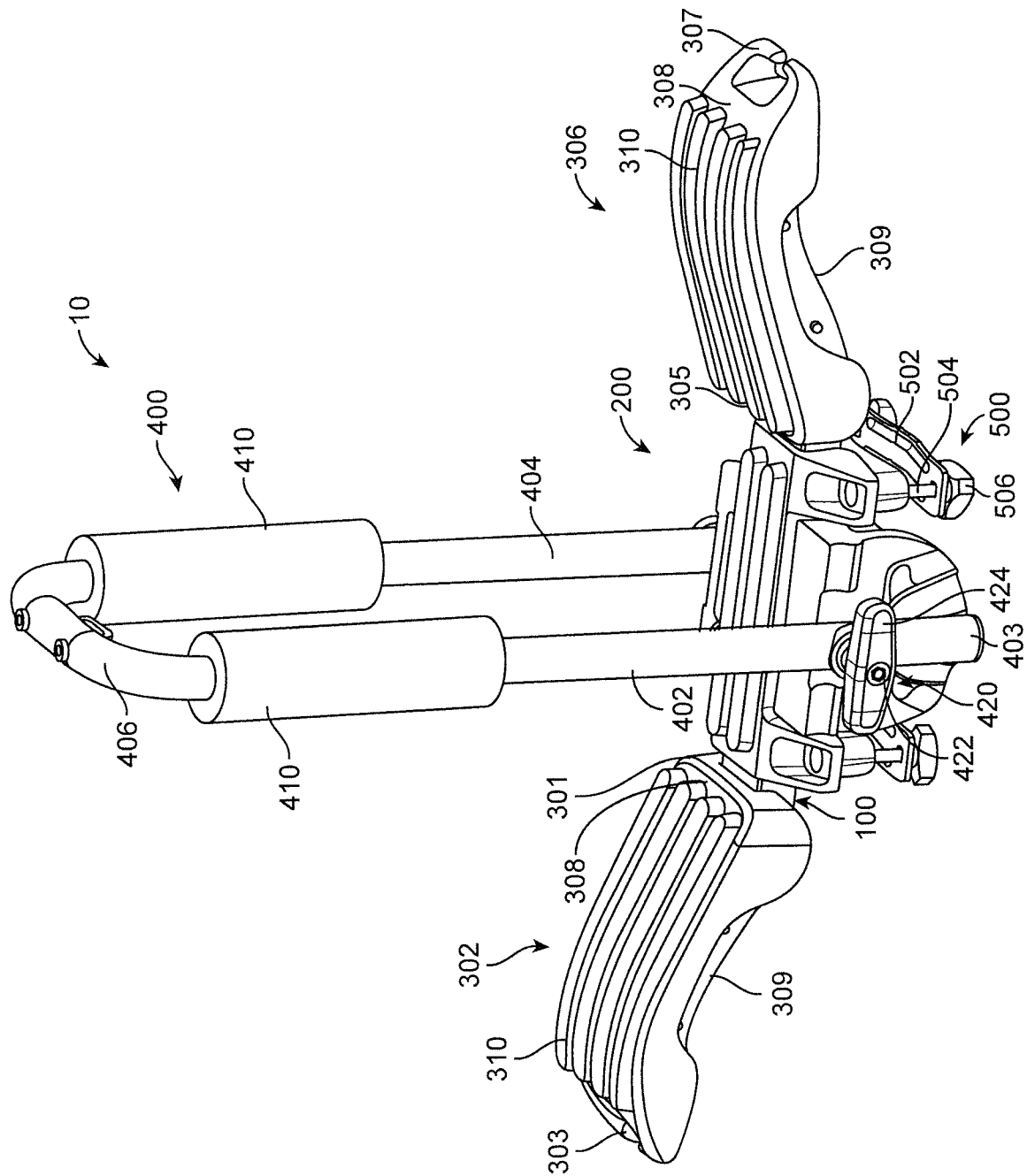
FIG. 1 illustrates a perspective view of a watercraft carrier, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Embodiments of the watercraft carriers 10 disclosed herein can have an upright 400 that is configured to rotate to multiple positions. This can allow watercraft carrier 10 to carry different types of watercraft, for example, but not limited to kayaks, canoes, surfboards, paddleboards, etc. In some embodiments, watercraft carrier 10 can carry multiple watercrafts at the same time. The versatility of watercraft carrier 10 allows the user to use one carrier for multiple types of watercraft. This can eliminate the need to switch carriers when the user wants to carry a different watercraft, which can be an inconvenient and time consuming task, for example, when using a roof-mounted carrier. The unique configuration of the watercraft carrier 10 can allow for safe and efficient carrying of watercrafts.

In some embodiments, a central hub 200 of watercraft carrier 10 can include a plurality of grooves 206, for example, on a side faceplate 204, which can be generally perpendicular to upper surface 202. The grooves can be concave surfaces of side faceplate 204 that are configured to receive an end of the upright 400 to facilitate securing the upright 400 in a plurality of positions corresponding to each groove 206. The upright 400 can therefore be rotated so that the end is disposed in a particular groove 206 such that the upright 400 is in a suitable position to carry a particular type of watercraft. This can include positions where upright 400 is used as a support for the watercraft and positions where upright 400 is disposed such that it cannot contact the watercraft.

Figure 4:
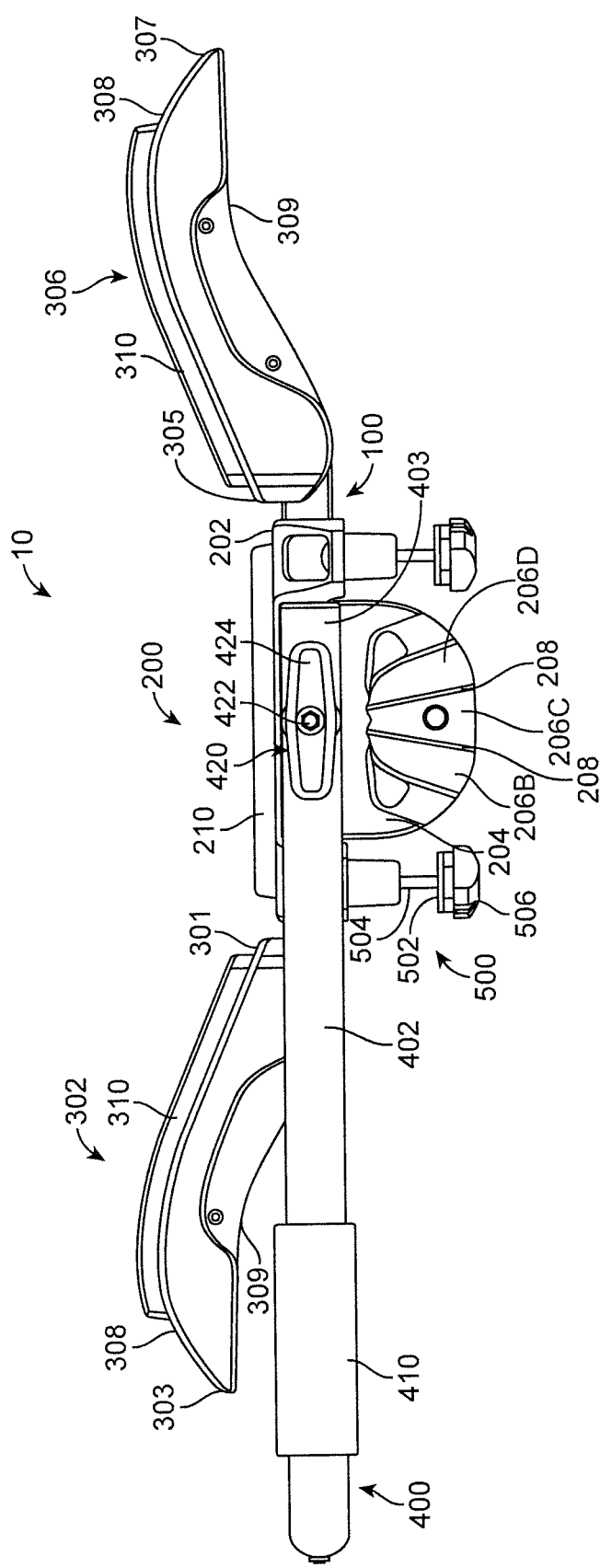
FIG. 4 illustrates a watercraft carrier with an upright in a first position, according to an embodiment.

Embodiments of the watercraft carriers 10 can also have a locking assembly 420 for releasably securing the upright 400 in a plurality of positions. In some embodiments, the locking assembly 420 can be disposed entirely below the upper surface 202 of central hub 200 of the watercraft carrier 10. In some embodiments, the locking assembly 420 can include any component associated with securing upright 400 in the plurality of positions, for example, but not limited to pivot bolt 422, knob or handle 424 or another adjustment device, and/or grooves 206 in a faceplate 204. In some embodiments, the locking assembly 420 can include a housing associated with any of these components, for example, a housing coupled to upright 400. In some embodiments, the upper surface 202 can include one or more pads 210. By locating the locking assembly 420 entirely below the upper surface 202 of the central hub 200, the locking assembly 420 does not interfere with (i.e., contact) a watercraft disposed on watercraft carrier 10. For example, when upright 400 is in a position as shown in FIG. 4, a watercraft can be disposed on watercraft carrier 10 without contacting locking assembly 420. Rather, the watercraft can contact, for example, only the pads 210, 310 of the central hub 200 and the wings 302, 306, when disposed on watercraft carrier 10. This can prevent additional forces from being imparted onto the watercraft by the upright 400 or locking assembly 420 that can damage the watercraft by way of scratching, cracking, etc.

In some embodiments, the wings 302, 306 of watercraft carrier 10 can be telescoping. For example, one or both of the wings 302, 306 can move in a longitudinal direction between a plurality of positions. This can adjust the width of watercraft carrier 10, which can allow watercraft carrier 10 to better carry watercraft of different shapes, sizes, widths, contours, etc. using the same watercraft carrier. This can prevent damage to the watercraft by having a better fit for the watercraft on the watercraft carrier.

FIGS. 1-9 illustrate embodiments of watercraft carrier 10. In some embodiments, watercraft carrier 10 can include a base frame 100 and a central hub 200. In some embodiments, watercraft carrier 10 can include a first wing 302 adjacent central hub 200. In some embodiments, watercraft carrier 10 can include a second wing 306 adjacent an opposite side of central hub 200 from first wing 302. In some embodiments, watercraft carrier 10 can include upright 400, which can be coupled to central hub 200. In some embodiments, upright 400 can rotate with respect to central hub 200 to multiple positions as shown, for example, in FIGS. 4-8. In some embodiments, watercraft carrier 10 can be coupled to a load bar on a vehicle roof, for example, using one or more mounting assembly 500.

Figure 2:
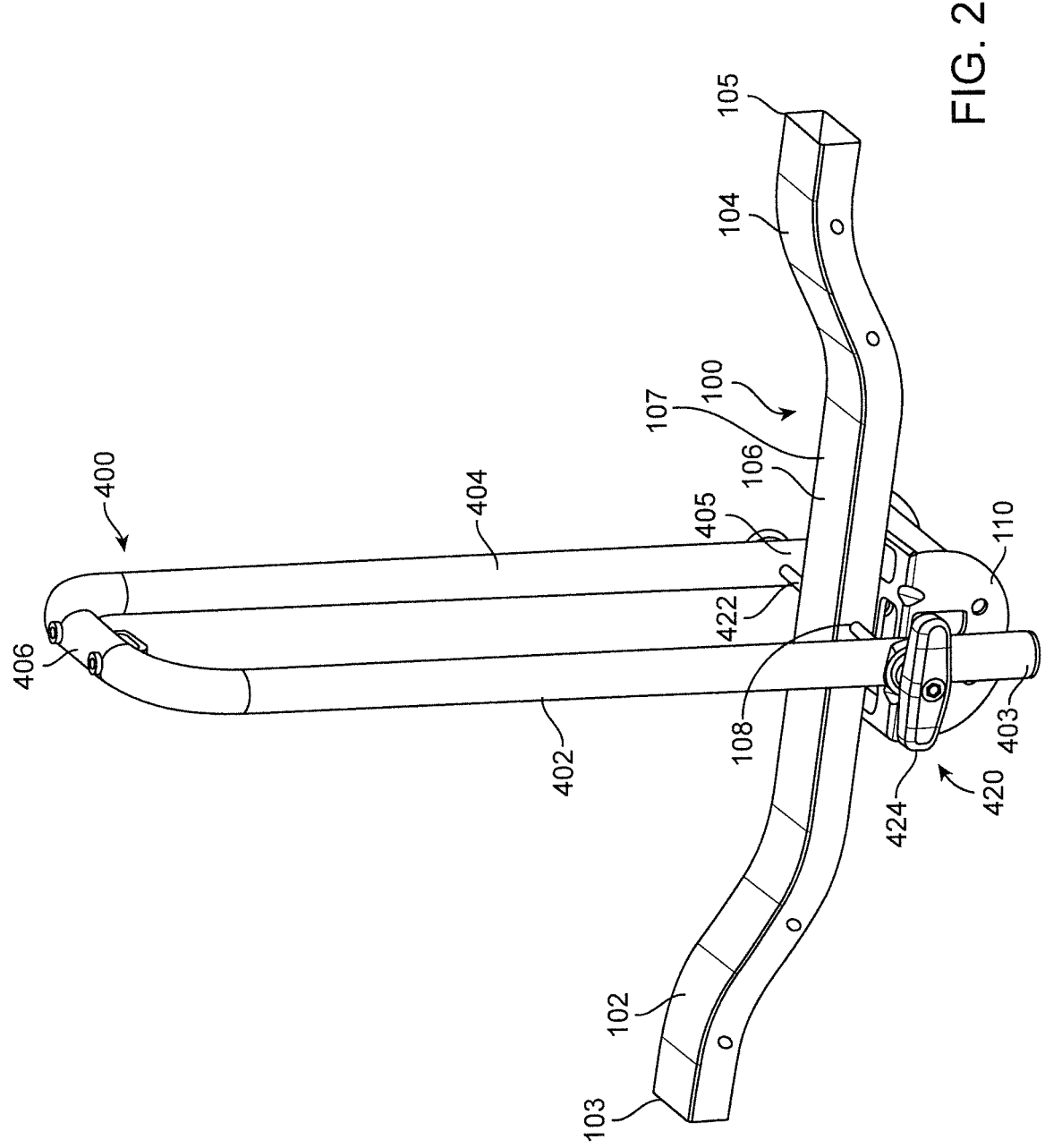
FIG. 2 illustrates a perspective view of a watercraft carrier base frame, according to an embodiment.

FIG. 2 illustrates base frame 100 of watercraft carrier 10, according to an embodiment, with first wing 302, second wing 306, and central hub 200 removed. In some embodiments, base frame 100 can include a first arm 102, a second arm 104, and a central portion 106 between the first arm 102 and the second arm 104. Base frame 100 can be made of any suitable material, for example, but not limited to metal or plastic. In some embodiments, base frame 100 can be hollow, which can reduce the weight of base frame 100. In some embodiments, base frame 100 can be a unitary piece of material, for example, an extruded metal tube.

As shown, for example, in FIG. 2, in some embodiments, central portion 106 of base frame 100 can be straight. In some embodiments, first arm 102 and/or second arm 104 of base frame 100 can be angled upward with respect to central portion 106. In some embodiments, arms 102, 104 can have a first portion extending from central portion 106 that is curved in a first direction and a second portion that is generally parallel with central portion 106. For example, a portion of first arm 102 near distal end 103 can be generally parallel to central portion 106. Similarly, in some embodiments, a portion of second arm 104, for example, near distal end 105 can be generally parallel to central portion 106. In some embodiments, arms 102, 104 can have a complex curvature. For example, a proximal portion can extend upward from central portion 106 and a distal portion can curve downward. This convex shape of base frame 100 can facilitate a contour formed by wings 302, 306 and central hub 200 best suited for carrying watercraft on watercraft carrier 10.

As shown, for example in FIG. 2, in some embodiments, undercarriage 110 can be coupled to base frame 100. In some embodiments, undercarriage 110 can be coupled to a bottom surface of base frame 100. In some embodiments, undercarriage 110 can serve as a mounting surface for central hub 200 including, for example, side faceplate 204.

The undercarriage 110 can support base frame 100 and central hub 200 and act as a support structure to hold the upright 400 in position.

As also shown, for example in FIG. 2, in some embodiments, upright 400 can be coupled to base frame 100. For example, in some embodiments, a pivot bolt 422 or other attachment mechanism can extend through a through-hole 108 on either side of base frame 100. This can allow upright 400 to rotate, for example, about the pivot bolt 422 and with respect to base frame 100. In some embodiments, pivot bolt 422 can be disposed through base frame 100 below an upper surface 107 of central portion 106.

In some embodiments, watercraft carrier 10 can include locking assembly 420 for upright 400. In some embodiments, locking assembly 420 can include a handle 424 or other tightening mechanism and pivot bolt 422. In some embodiments, handle 424 can be rotated about pivot bolt 422 to tighten locking assembly 420 in order to fix the position of upright 400. In some embodiments, when locking assembly 420 is untightened, upright 400 can freely rotate about pivot bolt 422. Other mechanisms can be used to lock, secure, and release upright 400, for example, a lever, knob, button, gearing system, etc. Generally, the size and shape of locking assembly 420 should be such that locking assembly 420 is disposed below upper surface 202 of central hub 200 at all times to avoid interfering with the watercraft being carried on watercraft carrier 10.

In some embodiments, upright 400 can include first post 402 and second post 404. In some embodiments, first post 402 and second post 404 can be disposed on opposite sides of base frame 100. In some embodiments, crossbar 406 can be disposed between first post 402 and second post 404 to connect the two posts. In some embodiments, upright 400 can be made from a unitary piece of material. Upright 400 can be made of any suitable material, for example, but not limited to metal or plastic. In some embodiments, upright 400 can be hollow. In some embodiments, upright 400 can have a U-shape (i.e., an upside down U-shape when disposed in a position as shown, for example, in FIG. 2).

Figure 3:
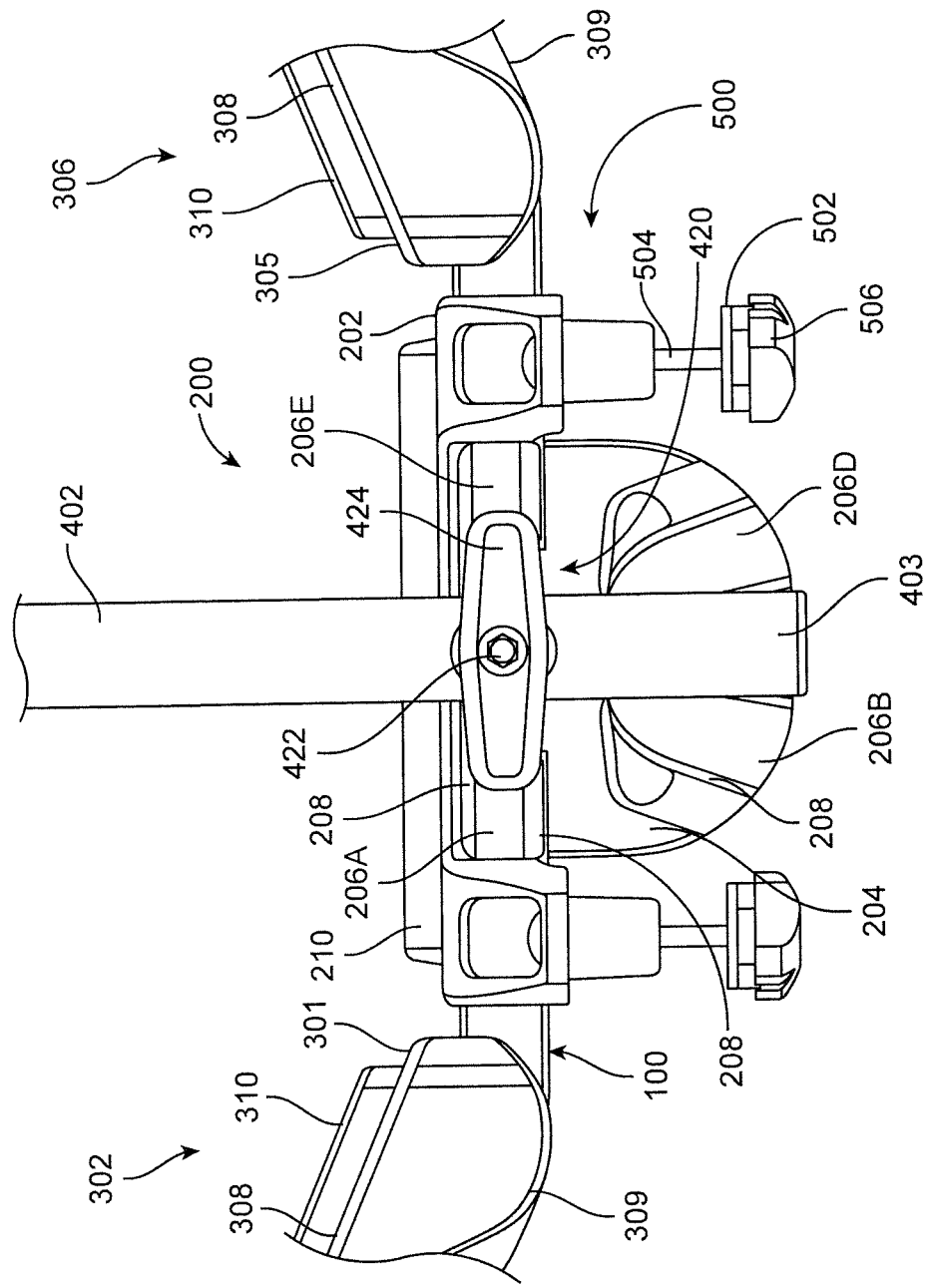
FIG. 3 illustrates an enlarged front view of a central hub of a watercraft carrier, according to an embodiment.

Referring, for example, to FIGS. 1 and 3, in some embodiments, watercraft carrier 10 can include central hub 200. Central hub 200 can be made from any suitable material, for example, but not limited to plastic or metal. Central hub 200 can be a single unitary piece or multiple pieces coupled together. For example, side faceplate 204 can be coupled to upper surface 202 of central hub 200.

In some embodiments, central hub 200 can be disposed on and/or coupled to base frame 100, for example, to central portion 106 of base frame 100. In some embodiments, central hub 200 can include upper surface 202 and one or more side faceplate 204. In some embodiments, a side faceplate 204 can be disposed on either side of central hub 200. In some embodiments, side faceplate 204 can be disposed on and/or coupled to undercarriage 110.

In some embodiments, side faceplate 204 can include one or more groove 206. In the embodiments shown in FIGS. 3-9, for example, side faceplate 204 includes five grooves 206A-206E. Side faceplate 204 can have any number of grooves 206, for example, one, two, three, four, five, six, or more grooves. In some embodiments, grooves 206 can be symmetrically disposed on side faceplate 204. In some embodiments, side faceplate 204 can form a "scallop" with a plurality of grooves 206 and ridges 208. In some embodiments, each groove 206 can be disposed below upper surface 202 of central hub 200.

Grooves 206 can be indentations into side faceplate 204, for example, a concave surface. In some embodiments, grooves 206 can be integrally formed with side faceplate 204. For example, in some embodiments, grooves 206 can be raised from the surface of side faceplate 204, forming an indentation within the raised portion. In some embodiments, grooves 206 can include ridges 208 on either side of groove 206. The ridges 208 can define the boundary of each groove 206. In some embodiments, two or more grooves can be directly adjacent to each other, for example, as shown in FIG. 4 with grooves 206B, 206C, and 206D. As such, in some embodiments, a first and second ridge 208 can define left and right sides of groove 206B, for example. In some embodiments, the second (i.e., right) ridge 208 of groove 206B can also define the first (i.e., left) ridge 208 of groove 206C. In some embodiments, grooves 206 and/or ridges 208 can originate from or be directed toward a central point, for example, a hole in side faceplate 204 through which pivot bolt 422 passes.

Grooves 206 can provide a seat within which a post 402, 404 of upright 400 can be disposed. Grooves 206 can be maintain the post 402, 404 of upright 400 in position even when locking assembly 420 is not fully tightened. For example, upon untightening locking assembly 420, upright 400 can be rotated such that the post 402, 404 can be moved from one groove 206 to the next. For example, when post 402 of upright 400 is disposed in groove 206D, as shown for example in FIG. 5, upright 400 can be rotated in the clockwise direction so that post 402 slides out of groove 206D, over ridge 208, and into groove 206C, as shown for example in FIG. 6.

As discussed above, in some embodiments, locking assembly 420 for upright 400 can be disposed below upper surface 202 of central hub 200. As shown for example in FIG. 3, each element of locking assembly 420 can be disposed below upper surface 202 of central hub 200. This can prevent locking assembly 420 from interfering with a watercraft being carried on watercraft carrier 10. More specifically, when upright 400 is in a position as shown, for example, in FIGS. 4 and 8, locking assembly 420 is disposed below the upper surface 202 of central hub 200 such that locking assembly 420 will not contact a watercraft disposed on watercraft carrier 10.

In some embodiments, central hub 200 can include one or more pad 210 disposed on upper surface 202 of central hub 200. For example, central hub 200 can include one, two, three, four, or more pads 210. In some embodiments, pad 210 can be part of or constitute upper surface 202 of central hub 200. In some embodiments, two pads 210 can be disposed on central hub 200, as shown for example in FIG. 1. Pads 210 can be made of any suitable material, for example, but not limited to foam, rubber, thermoplastic elastomer (TPE), EPDM, felt, or any other material to cushion the watercraft. In some embodiments, two elongate pads can be disposed along a length of central hub 200, for example, as shown in FIG. 1. Various numbers, shapes, and sizes for pads 210 are contemplated and the embodiments shown and described herein are not meant to be limiting. For example, in some embodiments, central hub 200 can have a plurality of pads extending across the width of upper surface. In some embodiments, a single pad can cover a majority of the upper surface 202 of central hub 200.

In some embodiments, central hub 200 can be coupled to a load bar by mounting assembly 500, for example, a load bar disposed across a width of a roof of a vehicle. In some embodiments, mounting assembly 500 can include one or more bracket 502 and one or more fastener 504. In some embodiments, fasteners 504 can be tightened using, for example, knob 506, to clamp the bracket 502 about the load bar. In some embodiments, two mounting assemblies 500 can be used to couple watercraft carrier 10 to the load bar. For example, in some embodiments, a mounting assembly 500 can be disposed at each end of central hub 200, for example, as shown in FIGS. 1 and 3.

In some embodiments, watercraft carrier 10 can include first wing 302. In some embodiments, first wing 302 can have a proximal end 301 closest to central hub 200 and a distal end 303. In some embodiments, watercraft carrier 10 can include second wing 306 having a proximal end 305 closest to central hub 200 and a distal end 307. First wing 302 and second wing 306 can be made from any suitable material, for example, but not limited to plastic or metal. In some embodiments, first wing 302 and second wing 306 can be the same material as central hub 200. In some embodiments, first wing 302 and second wing 306 can be part of a unitary structure that includes central hub 200.

First wing 302 and second wing 306 can each have an upper surface 308 and a lower surface 309. In some embodiments, first wing 302 can be mounted on or coupled to first arm 102 of base frame 100 and second wing 306 can be mounted on or coupled to second arm 104 of base frame 100. In some embodiments, first wing 302 and second wing 306 can follow the shape of first arm 102 and second arm 104 of base frame 100, respectively.

In some embodiments, one or more pad 310 can be disposed on upper surface 308 of first wing 302 and/or second wing 306. In some embodiments, pads 310 can be part of or constitute upper surface 308 of wings 302, 306. Pads 310 can be made from any suitable material, for example, but not limited to foam, rubber, thermoplastic elastomer (TPE), EPDM, felt, or any other material to cushion the watercraft. In some embodiments, one, two, three, four, five, or more pads can be disposed on wings 302, 306. In some embodiments, pads 310 can be elongate in shape and extend partially or entirely from respective proximal ends 301, 305 to distal ends 303, 307 of the wings 302, 306. In some embodiments, four elongate pads can be disposed along a length of wings 302, 306, for example, as shown in FIG. 1. Various numbers, shapes, and sizes for pads 310 are contemplated and the embodiments shown and described herein are not meant to be limiting. For example, in some embodiments, wings 302, 306 can have a plurality of pads extending across the width of upper surface 308. In some embodiments, a single pad can cover a majority of the upper surface 308 of wings 302, 306.

In some embodiments, watercraft carrier 10 can include upright 400. As described above, upright 400 can be coupled to central hub 200. In some embodiments, upright 400 can include one or more pad 410. Pad 410 can be made from any suitable material, for example, but not limited to foam, rubber, thermoplastic elastomer (TPE), EPDM, felt, or any other material to cushion the watercraft. In some embodiments, each of first post 402 and second post 404 can include a pad 410 disposed partially or entirely around the post 402, 404. In some embodiments, crossbar 406 can include a pad.

Figure 5:
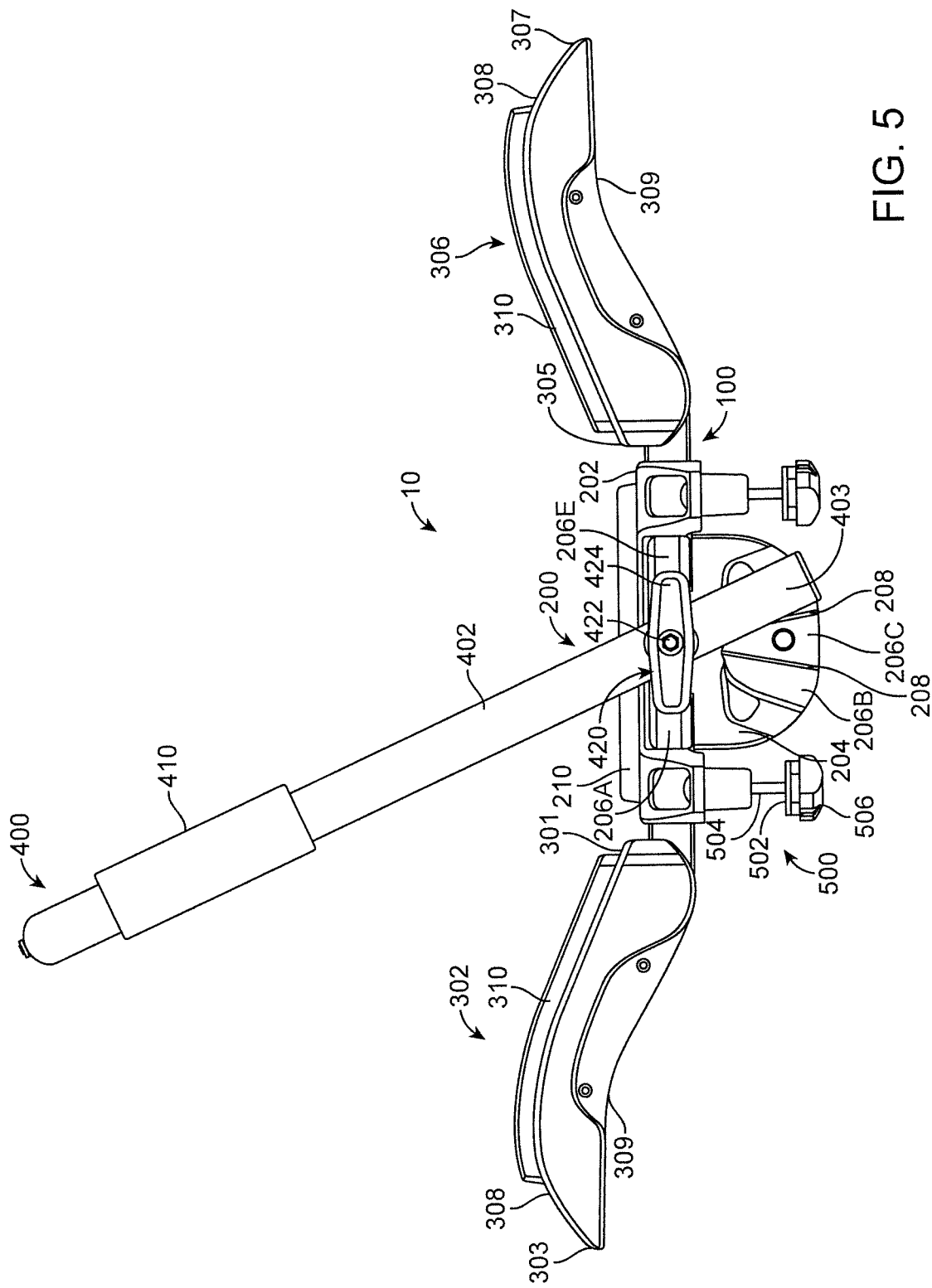
FIG. 5 illustrates a watercraft carrier with an upright in a second position, according to an embodiment.
Figure 6:
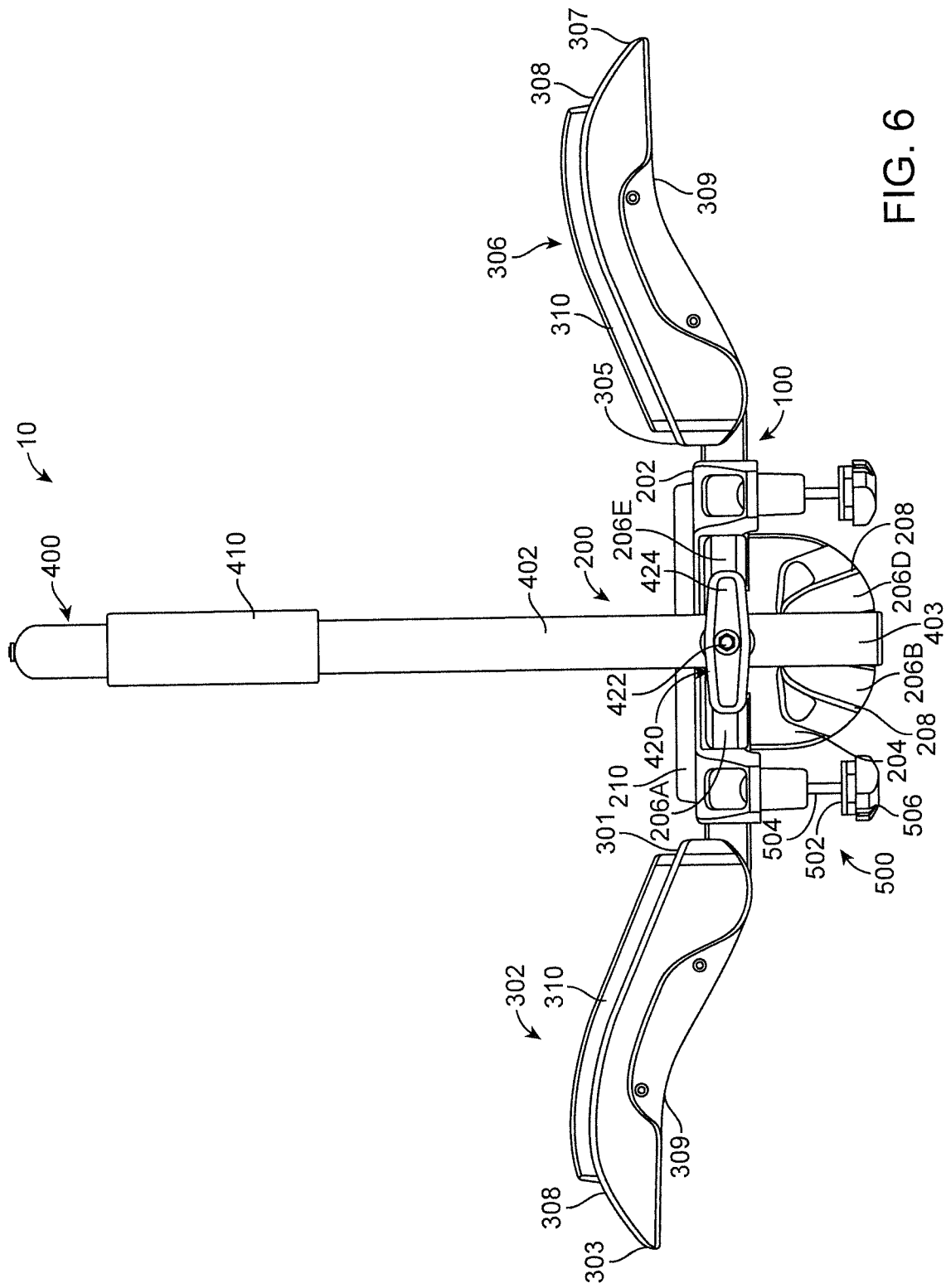
FIG. 6 illustrates a watercraft carrier with an upright in a third position, according to an embodiment.
Figure 7:
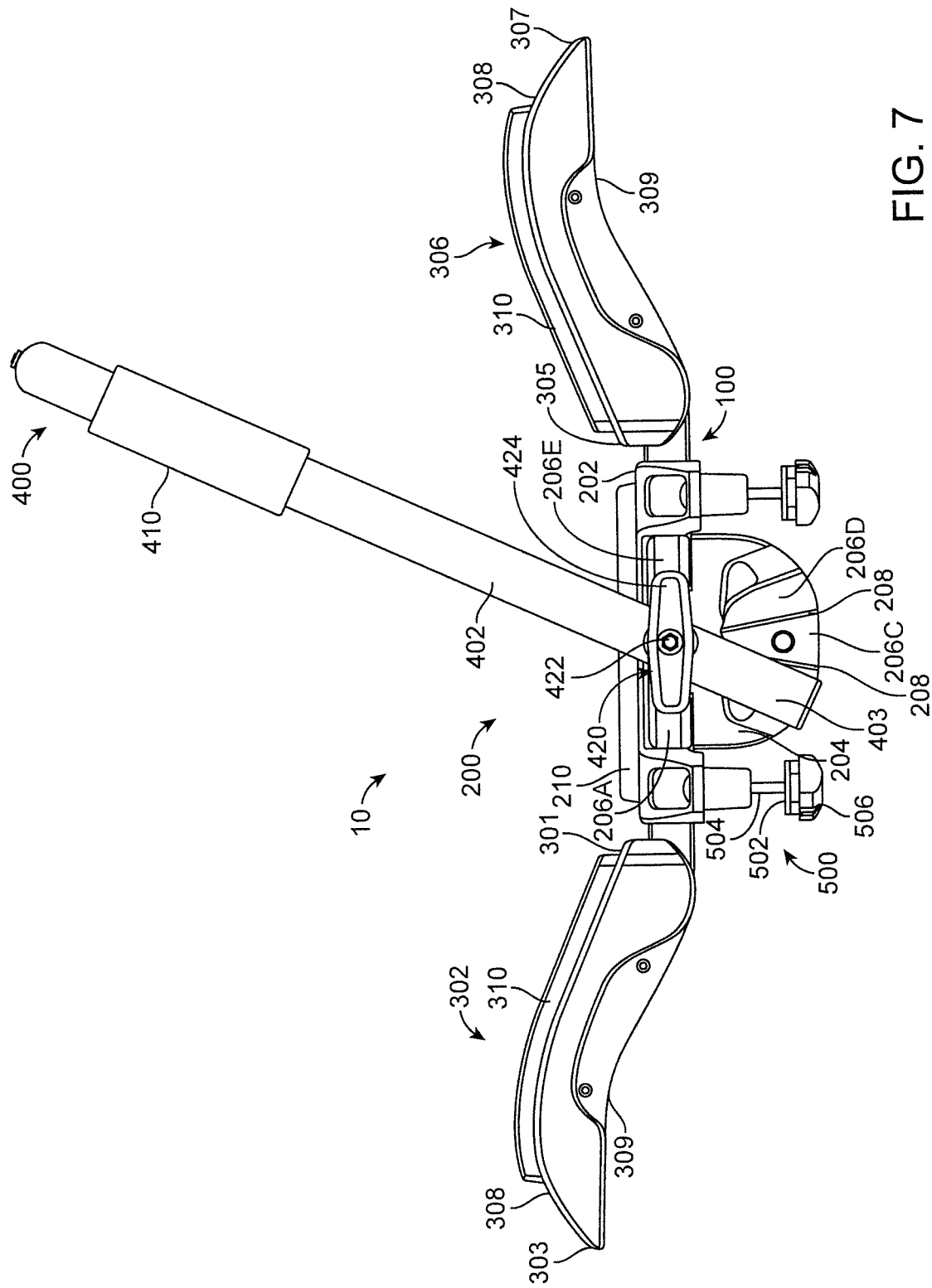
FIG. 7 illustrates a watercraft carrier with an upright in a fourth position, according to an embodiment.
Figure 8:
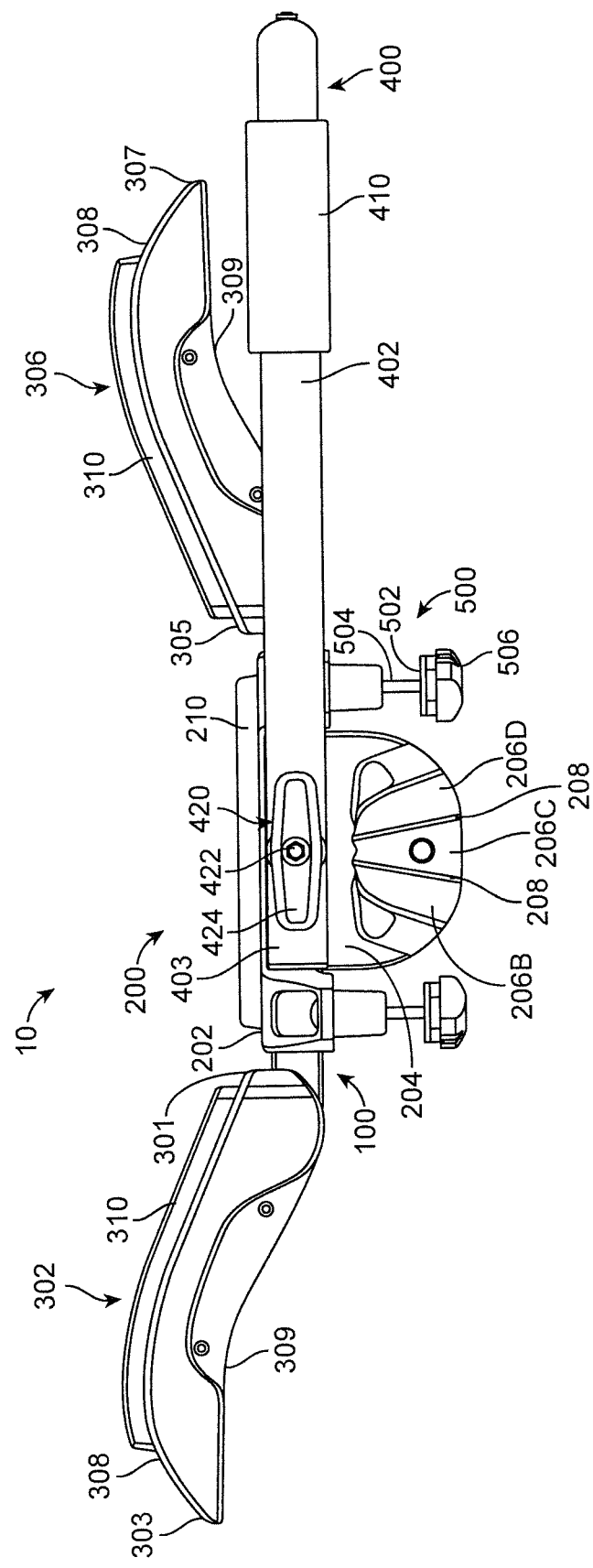
FIG. 8 illustrates a watercraft carrier with an upright in a fifth position, according to an embodiment.

Referring to FIGS. 4-8, for example, upright 400 can be configured to rotate between multiple positions. For example, FIGS. 4-8 represent positions of upright 400 at 0 degrees, 75 degrees, 90 degrees, 105 degrees, and 180 degrees, respectively, as upright 400 is rotated clockwise. Other positions can be selected depending on the desired angle(s) for upright 400. In each position, upright 400 can have post 402 and/or post 404 disposed in a respective groove 206A-E on side faceplate 204. By way of example, when upright 400 is in a first position, for example as shown in FIG. 4, attachment end 403 of first post 402 can be disposed in groove 206E. This can correspond to a 0 degree position, where upright 400 is parallel to the upper surface 202 of central hub 200. FIG. 5 shows upright 400 in a second position, where attachment end 403 of first post 402 is disposed in groove 206D. In some embodiments, this position can be anywhere from 0 to 90 degrees. FIG. 6 shows upright 400 in a third position, where attachment end 403 of first post 402 is disposed in groove 206C. In some embodiments, upright 400 can be disposed at 90 degrees with respect to the upper surface 202 of central hub 200 when first post 402 is disposed in groove 206C. FIG. 7 shows upright 400 in a fourth position, where attachment end 403 of first post 402 is disposed in groove 206B. In some embodiments, this position can be anywhere from 90 to 180 degrees. FIG. 8 shows upright 400 in a fifth position, where attachment end 403 of first post 402 is disposed in groove 206A. In some embodiments, this can correspond to a 180 degree position, where upright 400 is again parallel to the upper surface 202 of central hub 200. Other angles and positions for upright 400 are contemplated. For example, watercraft carrier 10 can include grooves 206 on side faceplate 204 of central hub 200 such that upright 400 can be disposed at a 45 and/or 135 degree angle.

The various positions for upright 400 can facilitate carrying certain types of watercraft. For example, when upright 400 is in a position as shown, for example in FIGS. 4 and 8, watercraft carrier 10 is configured to carry a surfboard or stand up paddleboard. Notably, the locking assembly 420 will not contact the watercraft because it is disposed below the upper surface 202 of central hub 200. When upright 400 is in a position as shown, for example in FIGS. 5 and 7, watercraft carrier 10 is configured carry a kayak or canoe. When upright 400 is in a position as shown, for example in FIG. 6, watercraft carrier 10 is configured to carry two kayaks or canoes, one on either side of upright 400. These examples are not meant to be limiting, and other watercraft can be carried in these positions. In some embodiments, straps, ropes, bungees, etc. can be used to secure the watercraft to watercraft carrier 10. The versatility of watercraft carrier 10 allows the user to have one carrier for many types of watercraft.

Figure 9:
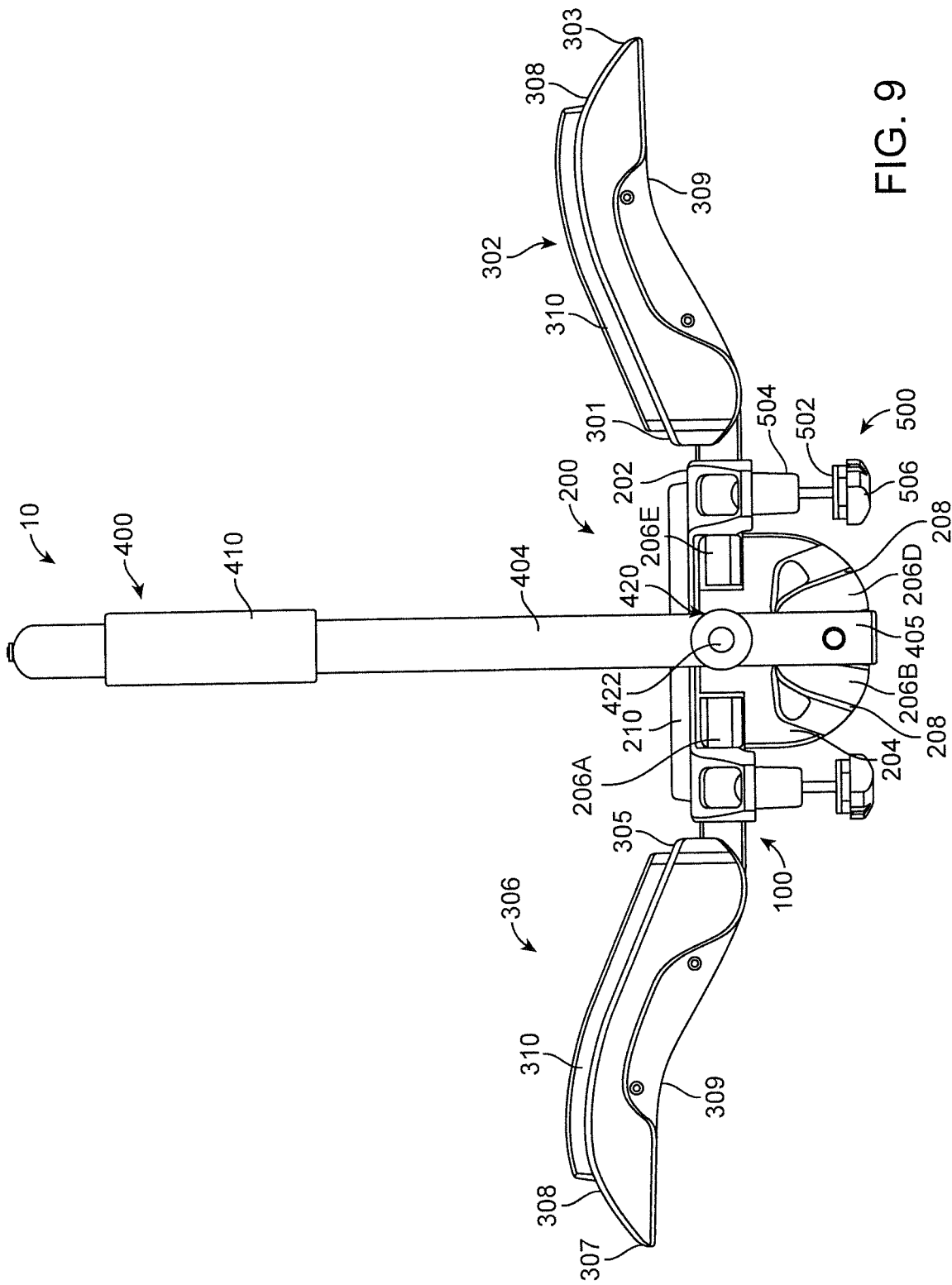
FIG. 9 illustrates a rear view of a watercraft carrier, according to an embodiment.

FIG. 9 illustrates a rear view of watercraft carrier 10, according to an embodiment. As shown in FIG. 9, each component of locking assembly 420 is disposed below upper surface 202 of central hub 200 on the rear of watercraft carrier 10 as well. In some embodiments, central hub 200 can have a side faceplate 204 on the rear of watercraft carrier 10 as described with respect to FIGS. 1 and 3-8. For example, in some embodiments, side faceplate 204 can include grooves 206A-E having ridges 208 defining edges thereof. In some embodiments, post 404 of upright 400 can move from one groove to the next as the upright is rotated with respect to the central hub 200.

Figure 10:
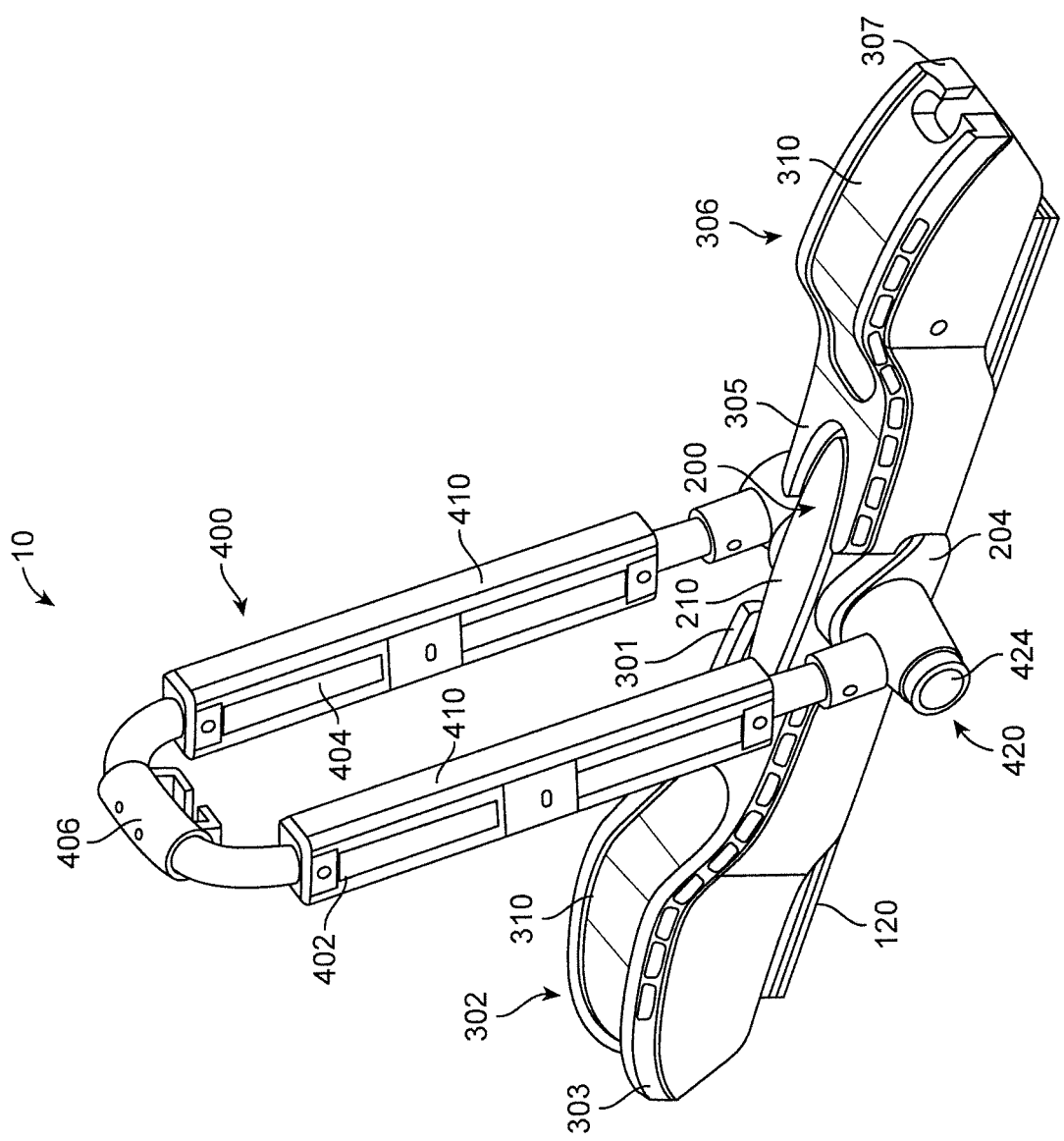
FIG. 10 illustrates a perspective view of a watercraft carrier, according to an embodiment.
Figure 11:
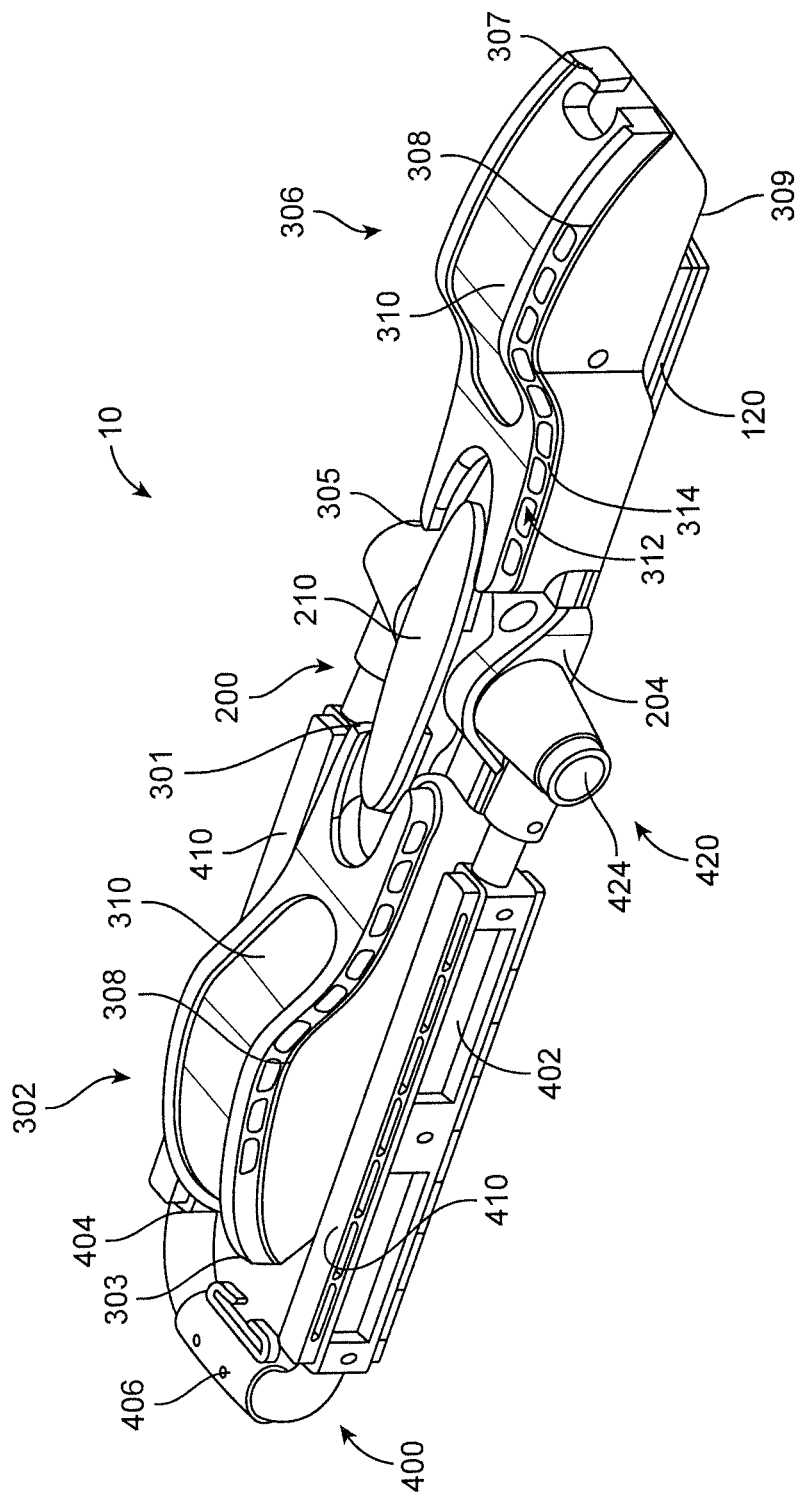
FIG. 11 illustrates a perspective view of a watercraft carrier, according to an embodiment.

FIGS. 10 and 11 illustrate watercraft carrier 10 according to another embodiment. Reference numbers in FIGS. 10 and 11 generally correspond to features described, for example, with respect to FIGS. 1-9. In some embodiments, central hub 200, first wing 302, and/or second wing 306 can be disposed on rail 120. Rail 120 can be an elongate member made of any suitable material, for example, but not limited to metal or plastic. Rail 120 can be straight or have one or more curved portions, for example, as described with respect to base frame 100 shown in FIG. 2.

Figure 12:
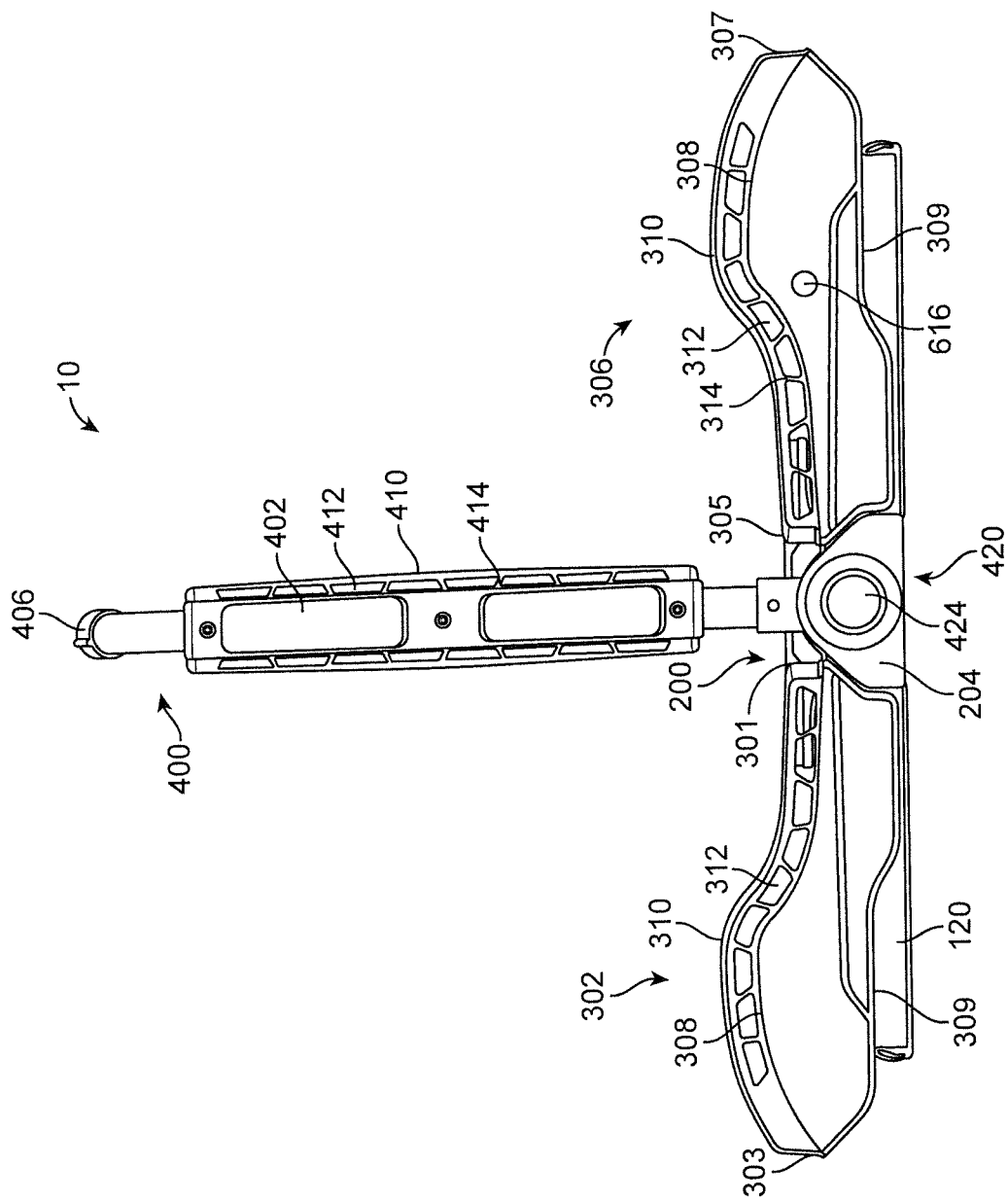
FIG. 12 illustrates a front view of a watercraft carrier, according to an embodiment.

In some embodiments, locking assembly 420 can include a knob or button 424, which can disengage upright 400 from a locked position such that upright 400 can be rotated. As shown, for example in FIG. 11, upright 400 can be rotated such that it is parallel with a longitudinal direction of watercraft carrier 10 and an upper surface of central hub 200. Upright 400 can lock into place in a plurality of positions between 0 degrees and 180 degrees. As shown in the embodiments of FIGS. 10-12, locking assembly 420 is disposed below an upper surface of central hub 200, for example, below an upper surface of pad 210. This prevents locking assembly 420 from contacting a watercraft disposed on watercraft carrier 10, as described above with respect to FIGS. 1 and 3-9.

As shown, for example in FIG. 12, in some embodiments, first wing 302 and/or second wing 306 (and associated pads 310) can be generally flat near central hub 200 and extend concave upward along a first portion moving away from proximal end 301, 305 and then transition to a concave downward curve along a second portion moving toward distal end 303, 307. This upward and downward contour can correspond to a contour of a watercraft to be carried on watercraft carrier 10, for example when upright 400 is in a position as shown in FIG. 11, thereby providing a more suitable surface to cushion and protect the watercraft from damage. This shape can also allow for a wide watercraft, for example a stand up paddleboard, to overhang the wings 302, 306 of watercraft carrier 10 without being damaged.

As also shown, for example in FIG. 12, in some embodiments, pads 310 of first wing 302 and second wing 306 and/or pad 410 of upright 400 can include one or more respective holes 312, 412 through the pads 310, 410. In some embodiments, ribs 314, 414 can be disposed between adjacent holes 312, 412 through the pads 310, 410. These holes 312, 412 and ribs 314, 414 can provide cushioning and flexion, reducing what are known as "hot spots" on the watercraft, where localized friction and/or pressure can build up while being carried on watercraft carrier 10 due to the shape of the watercraft and its position on the pads 310, 410 as described, for example, in U.S. patent application Ser. No. 14/811,376, which is incorporated by reference herein in its entirety.

Figure 13:
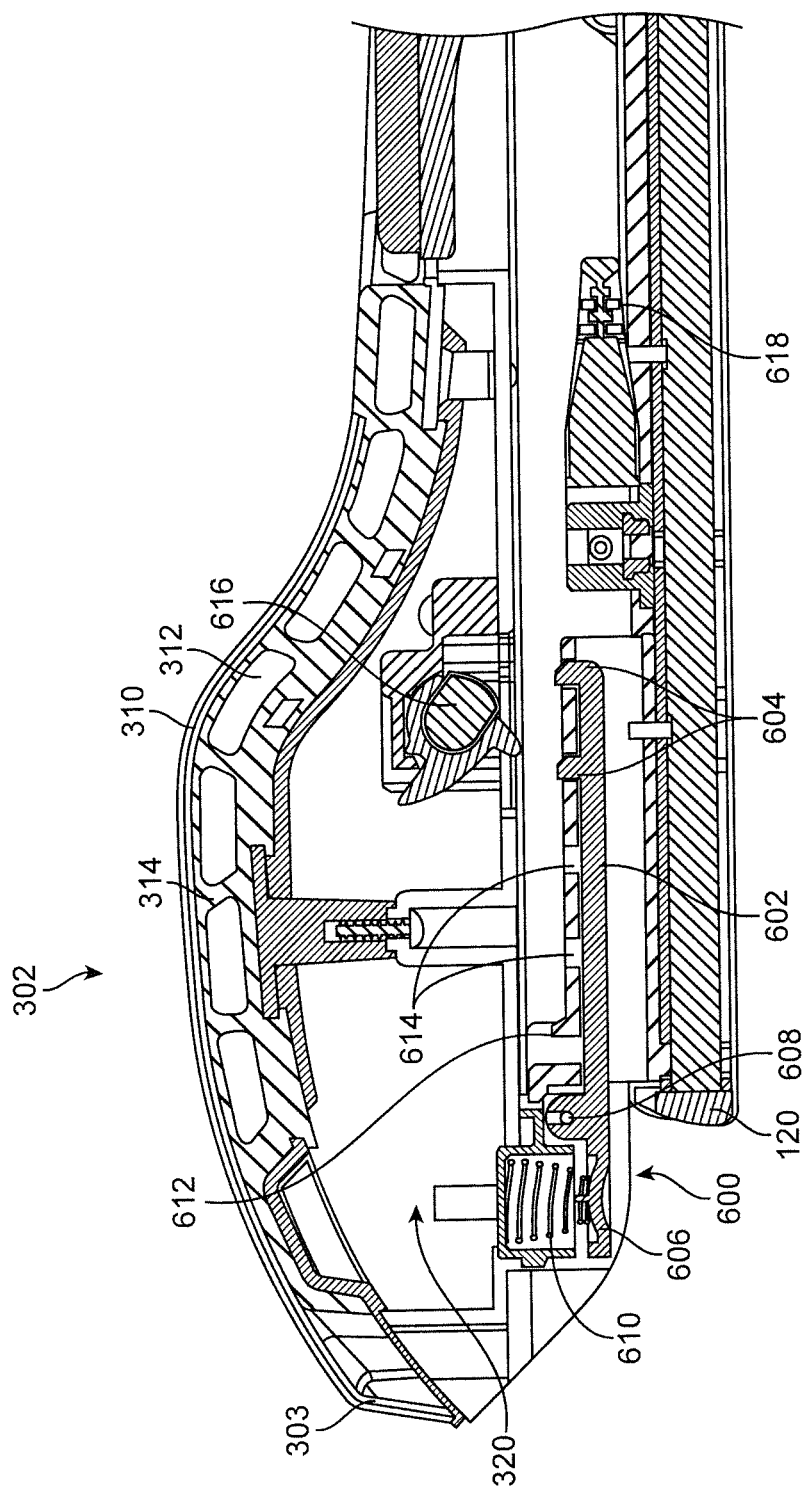
FIG. 13 illustrates an interior cross-sectional view of a watercraft carrier wing, according to an embodiment.
Figure 14:
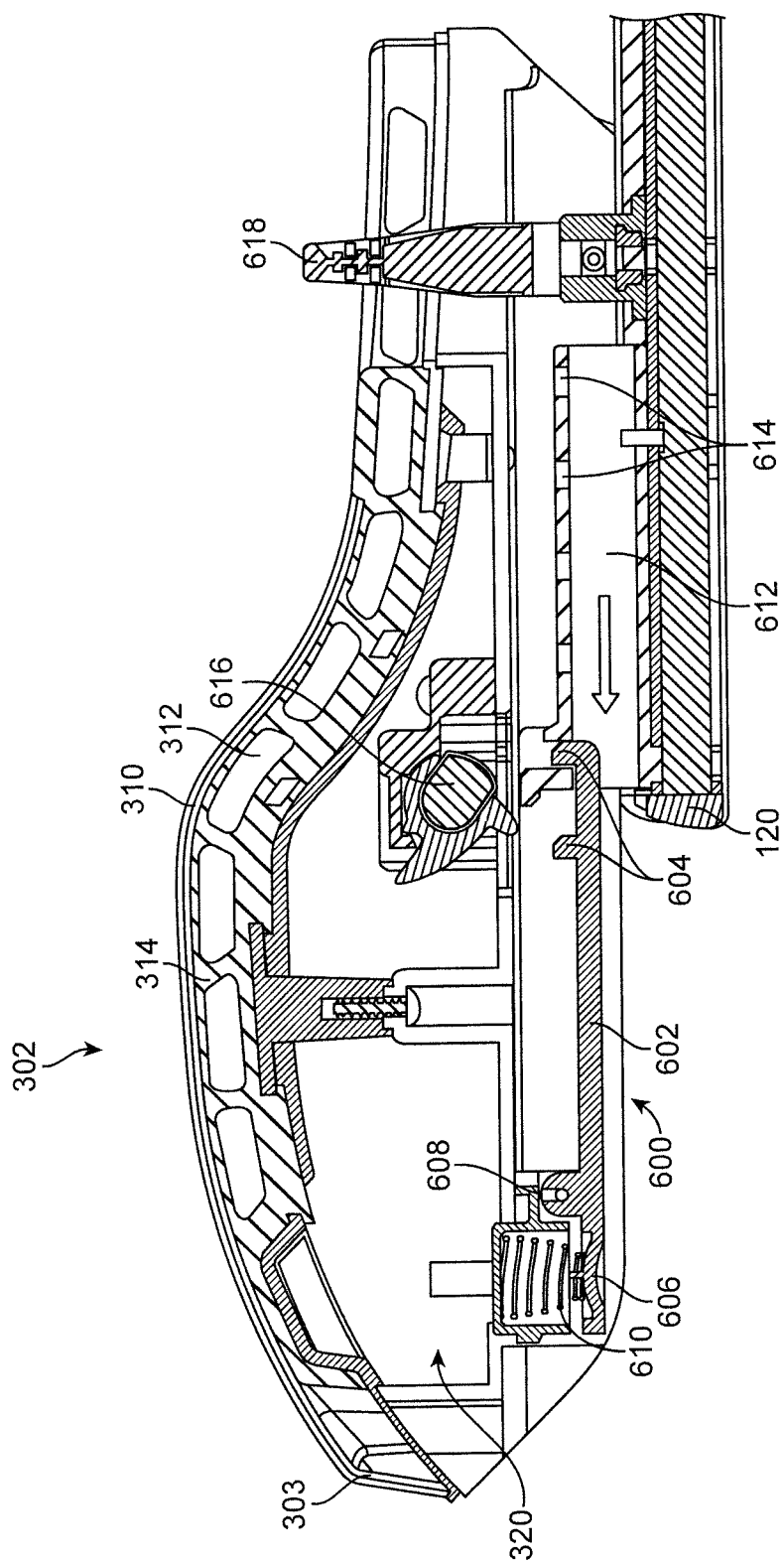
FIG. 14 illustrates an interior cross-sectional view of a watercraft carrier wing, according to an embodiment.

As shown, for example in FIGS. 13 and 14, in some embodiments, first wing 302 and/or second wing 306 can be telescoping. In some embodiments, first wing 302 and/or second wing 306 can move away from and back toward central hub 200. For example, first wing 302 and/or second wing 306 can extend outward along rail 120 so that watercraft carrier 10 can accommodate watercrafts of various widths, shapes, and sizes.

In some embodiments, for example, first wing 302 and/or second wing 306 can include telescoping assembly 600, which can allow first wing 302 to be positioned at various locations along rail 120. In some embodiments, telescoping assembly 600 can be disposed at least partially within an interior compartment 320 of the wings 302, 306. In some embodiments, telescoping assembly 600 can include lever 602 having one or more tooth 604 and an activation end 606. In some embodiments, lever 602 can be configured to rotate about a pivot pin 608. In some embodiments, by pressing activation end 606 of lever 602, the teeth 604 can disengage from a lock strip 612 having one or more slot 614 within which teeth 604 can be disposed in a locked configuration. Upon disengaging the teeth 604 from the lock strip 612, the user can slide wing 302, 306 along the rail 120 to another position. In some embodiments, a spring 610 can bias lever 602 to a locked configuration so that teeth 604 engage slots 614 of lock strip 612 when the teeth 604 line up with slots 614.

In some embodiments, telescoping assembly 600 can include lock 616. Lock 616 can prevent activation of activation end 606 of lever 602 so that the wing 302, 306 cannot be moved from the locked configuration even when pressing the activation end 606. In some embodiments, an attachment lever 618 can be disposed under first wing 302 such that attachment lever 618 is exposed only when first wing 302 is in the farthest telescoping position, for example, as shown in FIG. 14. In some embodiments, attachment lever 618 can be configured such that watercraft carrier 10 can only be removed from attachment with a load bar when attachment lever 618 is activated, for example as shown in FIG. 14.

Methods of operating a watercraft carrier can be accomplished according to the manners of operation disclosed herein. For example, a method of adjusting the watercraft carrier can include positioning an upright coupled to a central hub in a first position and rotating the upright to a second position. In some embodiments, the upright can have a locking assembly disposed below an upper surface of the central hub such that when the upright is in the second position, a watercraft disposed on the watercraft carrier does not contact the upright or the locking assembly. In some embodiments, locking assembly can be tightened to secure the upright in place and loosened to allow the upright to rotate.

In some embodiments, positioning the upright in the first position can include rotating the upright such that a portion of the upright is disposed above the upper surface of the central hub. For example, the user can rotate the upright so that it is disposed at 90 degrees with respect to the upper surface of the central hub. In some embodiments, rotating the upright to the second position can include rotating the upright such that the upright is disposed below the upper surface of the central hub. For example, the upright can be parallel to the upper surface when disposed in the second position. In some embodiments, when rotating upright 400 to the second position, upright 400 can pass proximate the distal end of a wing of the watercraft carrier, for example, within 6 inches of the distal end.

In some embodiments, the watercraft carrier can be configured to support a first type of watercraft when the upright is in the first position. In some embodiments, the watercraft carrier can be configured to support a second type of watercraft when the upright is in the second position. In some embodiments the first and second type of watercraft can be the same type of watercraft. In some embodiments, the first and second type of watercraft can be different watercraft. For example, the first watercraft can be a kayak or canoe and the second watercraft can be a surfboard or stand up paddleboard.

In some embodiments, rotating the upright from the first position to the second position can include disengaging the upright from a first groove on a side faceplate of the central hub and engaging the upright with a second groove on the side faceplate of the central hub. In some embodiments, the upright can slide out of the concave portion of the groove, over a ridge defining an edge of the groove, and into an adjacent groove.

In some embodiments, the method can include translating a first wing of the watercraft carrier from a first longitudinal position to a second longitudinal position. This can occur in a telescoping manner, for example, along a longitudinal rail. In some embodiments, the method can include translating a second wing of the watercraft carrier from a first longitudinal position to a second longitudinal position. In some embodiments, the method can include activating a lever, for example, by pressing on an activation end accessible to the user. This can disengage a tooth (or multiple teeth) on the lever from a slot (or slots) in a lock strip so that the wing can slide along the rail until the tooth (or teeth) engages another slot in the lock strip.

In some embodiments, the watercraft carrier can be coupled to a vehicle, for example, to a load bar of a vehicle. In some embodiments, two or more watercraft carriers can be used to support a single watercraft.

It is to be appreciated that the Detailed Description section, and not the Brief Summary and Abstract sections, is intended to be used to interpret the claims. The Summary and Abstract sections may set forth one or more but not all exemplary embodiments of watercraft carriers as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A watercraft carrier, comprising:
   a central hub having an upper surface configured to receive a watercraft;
   a rotatable upright having a distal end and configured to be disposed in a plurality of positions;
   a locking assembly configured to secure the upright in the plurality of positions;
   a side faceplate extending downward relative to the upper surface and comprising a plurality of grooves defining concave surfaces on the side faceplate configured to receive the distal end of the rotatable upright; and
   an undercarriage coupled to the central hub and comprising a mounting surface for the side faceplate.

2. The watercraft carrier of claim 1, wherein a portion of the upright is disposed above the upper surface of the central hub in a first position.

3. The watercraft carrier of claim 2, wherein the upright is disposed below the upper surface of the central hub in a second position.

4. The watercraft carrier of claim 1, wherein the upper surface of the central hub comprises one or more pads configured to engage a surface of the watercraft.

5. The watercraft carrier of claim 1, wherein the upright comprises a unitary member having a first post coupled to a first side of the central hub, a second post coupled to a second side of the central hub, and a crossbar disposed between the first post and the second post.

6. The watercraft carrier of claim 5, wherein the locking assembly comprises a pivot bolt extending through the first post, the central hub, and the second post and a handle configured to rotate about the pivot bolt to releasably secure the upright in the plurality of positions.

7. The watercraft carrier of claim 1, wherein the grooves are integrally formed with the side faceplate.

8. The watercraft carrier of claim 1, wherein the grooves comprise a first ridge and a second ridge protruding from the side faceplate defining edges of the grooves.

9. The watercraft carrier of claim 8, wherein a second ridge of a first groove defines a first ridge of a second groove.

10. The watercraft carrier of claim 1, wherein the upright is parallel to the upper surface of the central hub when the upright is disposed in a first groove, and wherein the upright is perpendicular to the upper surface of the central hub when the upright is disposed in a second groove.

11. The watercraft carrier of claim 1, wherein the side faceplate comprises five grooves, wherein the upright is disposed at an angle of 0 degrees, 75 degrees, 90 degrees, 105 degrees, and 180 degrees with respect to the upper surface of the central hub when the upright is disposed in a first, second, third, fourth, and fifth groove, respectively.

12. The watercraft carrier of claim 1, wherein the watercraft carrier is configured to carry a kayak when the upright is in a first position and the watercraft carrier is configured to carry a stand up paddleboard when the upright is in a second position.

13. The watercraft carrier of claim 1, wherein the upper surface of the central hub is flat.

14. The watercraft carrier of claim 1, wherein the upper surface of the central hub is continuous.

15. The watercraft carrier of claim 1, wherein the locking assembly comprises a single handle coupled to a first end of a pivot bolt extending through the central hub.

16. The watercraft carrier of claim 1, wherein the side faceplate comprises a planar surface comprising a plurality of exterior grooves.

17. A watercraft carrier for carrying multiple types of watercraft on a vehicle, the watercraft carrier comprising:
    a base frame having an upper surface, a central portion, and a pair of arms extending from the central portion;
    a central hub having an upper surface, the central hub disposed on the central portion of the base frame;
    a first wing having an upper surface, the first wing disposed on a first arm of the base frame;
    a second wing having an upper surface, the second wing disposed on a second arm of the base frame;
    an upright rotatably coupled to the central hub and configured to be disposed in a plurality of positions; and
    a locking assembly coupling the upright with the central hub and configured to secure the upright in the plurality of positions, wherein the entire locking assembly is disposed below the upper surface of the base frame,
    wherein the locking assembly comprises a single handle coupled to a first end of a pivot bolt extending through the central hub.

18. The watercraft carrier of claim 17, wherein the upper surfaces of the central hub, the first wing, and the second wing comprise pads configured to receive multiple types of watercraft.

19. The watercraft carrier of claim 17, wherein the upright is configured to rotate from a first position where a portion of the upright is disposed above the upper surface of the central hub to a second position where the upright is disposed below the upper surface of the central hub.

20. The watercraft carrier of claim 19, wherein a crossbar of the upright passes proximate a distal end of the first wing when rotating the upright from the first position to the second position.

21. A method of adjusting a watercraft carrier for carrying a watercraft on a vehicle, the method comprising:
    unlocking a locking assembly, wherein the locking assembly comprises a single handle coupled to a first end of a pivot bolt extending through a central hub of the watercraft carrier;
    positioning an upright coupled to the central hub of the watercraft carrier in a first position,
    wherein a distal end of the upright is disposed in a first groove in a surface of a side faceplate of the watercraft carrier in the first position, and
    wherein the watercraft carrier is configured to support a first type of watercraft when the upright is in the first position; and
    rotating the upright to a second position, wherein the distal end of the upright is disposed in a second groove in the surface of the side faceplate of the watercraft carrier in the second position, and
    wherein the watercraft carrier is configured to support a second type of watercraft when the upright is in the second position.

22. The method of claim 21, wherein positioning the upright in the first position comprises rotating the upright such that a portion of the upright is disposed above the upper surface of the central hub, and wherein rotating the upright to the second position comprises rotating the upright such that the upright is disposed below the upper surface of the central hub.

23. The method of claim 21, wherein rotating the upright from the first position to the second position comprises sliding the distal end of the upright along the surface of the side faceplate from the first groove to the second groove.

24. A watercraft carrier for a vehicle roof, comprising:
    a central hub having an upper surface configured to receive a first type of watercraft;
    a mounting assembly coupled to the central hub and configured to couple the watercraft carrier to a load bar on the vehicle roof;
    a rotatable upright coupled to the central hub and configured to support the first type of watercraft when the rotatable upright is in a first position;
    a first wing having a proximal end adjacent the central hub, a distal end, and an upper surface; and
    a second wing disposed opposite the first wing, the second wing having a proximal end adjacent the central hub, a distal end, and an upper surface,
    wherein a first portion of the upper surface proximate the distal end of the first wing and a second portion of the upper surface proximate the distal end of the second wing are configured to support a second type of watercraft when the rotatable upright is in a second position,
    wherein the first portion and the second portion are generally parallel with the upper surface of the central hub.

25. The watercraft carrier of claim 24, wherein the first portion and the second portion are disposed vertically upward relative to the upper surface of the central hub.

26. The watercraft carrier of claim 24, further comprising an elongate base frame having a central portion, a first arm, and a second arm,
    wherein the central hub is disposed on the central portion of the base frame, the first wing is disposed on the first arm, and the second wing is disposed on the second arm.

27. The watercraft carrier of claim 24, wherein the upper surface of the central hub, the upper surface of the first wing, and the upper surface of the second wing each comprise padding.

28. The watercraft carrier of claim 24, wherein the first portion is the uppermost portion of the first wing.

* * * * *